United States Patent
Lee et al.

(10) Patent No.: US 8,892,156 B2
(45) Date of Patent: Nov. 18, 2014

(54) MOBILE TERMINAL HAVING FLAT PANEL SOUND OUTPUT UNIT AND VIBRATION GENERATION METHOD FOR THE SAME

(75) Inventors: Eun Hwa Lee, Suwon-si (KR); In Kuk Yun, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 985 days.

(21) Appl. No.: 12/350,275

(22) Filed: Jan. 8, 2009

(65) Prior Publication Data

US 2009/0176534 A1    Jul. 9, 2009

(30) Foreign Application Priority Data

Jan. 8, 2008  (KR) .............................. 2008-0002172

(51) Int. Cl.
*H04M 1/00*     (2006.01)
*G06F 3/01*     (2006.01)
*G06F 3/041*    (2006.01)
*H04M 19/04*    (2006.01)

(52) U.S. Cl.
CPC ............... *G06F 3/041* (2013.01); *G06F 3/016* (2013.01); *H04M 19/04* (2013.01)
USPC ...................................................... 455/550.1

(58) Field of Classification Search
CPC ................................ G06F 3/0488; H04M 1/00
USPC .............. 340/407.2; 455/90, 550, 575.1, 566; 381/152, 400, 431, 412, 107, 86; 310/311; 345/173

See application file for complete search history.

(56) References Cited

U.S. PATENT DOCUMENTS

| | | | | |
|---|---|---|---|---|
| 5,767,457 | A | * | 6/1998 | Gerpheide et al. .......... 178/18.03 |
| 5,977,867 | A | * | 11/1999 | Blouin ........................ 340/407.2 |
| 2005/0152564 | A1 | * | 7/2005 | Harris et al. ................... 381/152 |
| 2006/0022958 | A1 | | 2/2006 | Shiga |
| 2006/0099996 | A1 | * | 5/2006 | Kanai ........................... 455/566 |
| 2006/0120542 | A1 | * | 6/2006 | Lee et al. ....................... 381/152 |
| 2008/0137883 | A1 | * | 6/2008 | Araki ............................ 381/107 |

FOREIGN PATENT DOCUMENTS

JP          2006-40005 A        2/2006

* cited by examiner

*Primary Examiner* — Kiet Doan
(74) *Attorney, Agent, or Firm* — Cha & Reiter, LLC.

(57) ABSTRACT

A mobile terminal having a flat panel sound output unit and vibration generation method for the same are disclosed. When a user touches the mobile terminal, the user can feel a sense of touch through the flat panel sound output unit. The mobile terminal includes: a touch screen; a flat panel sound output unit attached on a surface of the touch screen to generate sounds or vibrations according to an input signal; and a vibration processor sending, when a touch event occurs at the touch screen, a signal to the flat panel sound output unit to generate vibrations corresponding to the touch event. Hence, the method can provide a sense of touch to the user without use of a separate vibration motor.

15 Claims, 3 Drawing Sheets

MOBILE TERMINAL HAVING FLAT PANEL SOUND OUTPUT UNIT AND VIBRATION GENERATION METHOD FOR THE SAME

CLAIMS OF PRIORITY

This application claims the benefit under 35 U.S.C. §119 (a) of an earlier Korean patent application filed in the Korean Intellectual Property Office on Jan. 8, 2008 and assigned Serial No. 2008-0002172, the entire disclosure of which is hereby incorporated by reference.

BACKGROUND OF THE INVENTION

1. Field of the Invention

The present invention relates generally to a generation vibration in a mobile terminal. More particularly, the present invention relates to a mobile terminal having a flat panel unit that provides a user with a sense of touch through the flat panel unit, and a vibration generation method thereof.

2. Description of the Related Art

In general, a mobile terminal can perform various functions implemented by wireless communication and application programs. It includes, by way of example, a personal mobile communication terminal, personal digital assistant (PDA), smart phone, international mobile communications 2000 (IMT-2000) terminal, and wireless local area network (WLAN) terminal.

With steady advances in technologies, mobile terminals have become miniaturized and lightweight, and have now evolved into multifunction convergence terminals that perform various functions related to MP3 audio, digital photographing, navigation, and Internet browsing. In today word, mobile terminals are one of the necessaries of life.

Various technologies have been applied to mobile terminals. For example, touch screens are installed on the display units of mobile terminals, so that users can execute various functions by touching the screens. Flat panel sound technology is also applied to mobile terminals.

Currently, flat panel sound technology is used for producing only high-frequency sounds to prevent screen distortions due to vibrations, and woofers are separately used to produce low-frequency sounds. The application of flat panel sound technology to mobile terminals (in particular, those having touch screens) is somewhat unsatisfactory.

SUMMARY OF THE INVENTION

The present invention has been made in view of the above problems, and the present invention provides a mobile terminal having both a flat panel capable of sound output and a touch screen function.

The present invention also provides a vibration generation method for a mobile terminal having a flat panel sound output unit and a touch screen that provides the user with a sense of touch through vibrations caused by the flat panel sound output unit.

In accordance with an exemplary embodiment of the present invention, there is provided a mobile terminal including: a touch screen; a flat panel sound output unit, coupled to a surface of the touch screen, generating sounds or vibrations according to an input signal; and a vibration processor sending, when a touch event occurs at the touch screen, a signal to the flat panel sound output unit, the signal directing the flat panel sound output unit to generate vibrations corresponding to the touch event.

In accordance with another exemplary embodiment of the present invention, there is provided a vibration generation method, using a flat panel sound output unit coupled to a surface of a touch screen, including: creating a touch event at the touch screen; sending, upon a detection of the touch event, a vibration generation request signal to the flat panel sound output unit; and vibrating the flat panel sound output unit in response to the vibration generation request signal.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Further, note that same reference symbols are used throughout the drawings to refer to the same or like parts. For the purposes of clarity and simplicity, detailed descriptions of well-known functions and structures incorporated herein may be omitted to avoid obscuring the subject matter of the present invention.

In the accompanying drawings, some elements are exaggerated, omitted, or only outlined in brief, and thus may be not drawn to scale.

In the description, a "touch screen" refers to a display unit having a touch input section (for example, touch panel). A touch screen generates a signal to be input when a physical force is applied to the touch input section attached on the display unit.

Now, embodiments of the present invention are described in detail.

Figure 1:
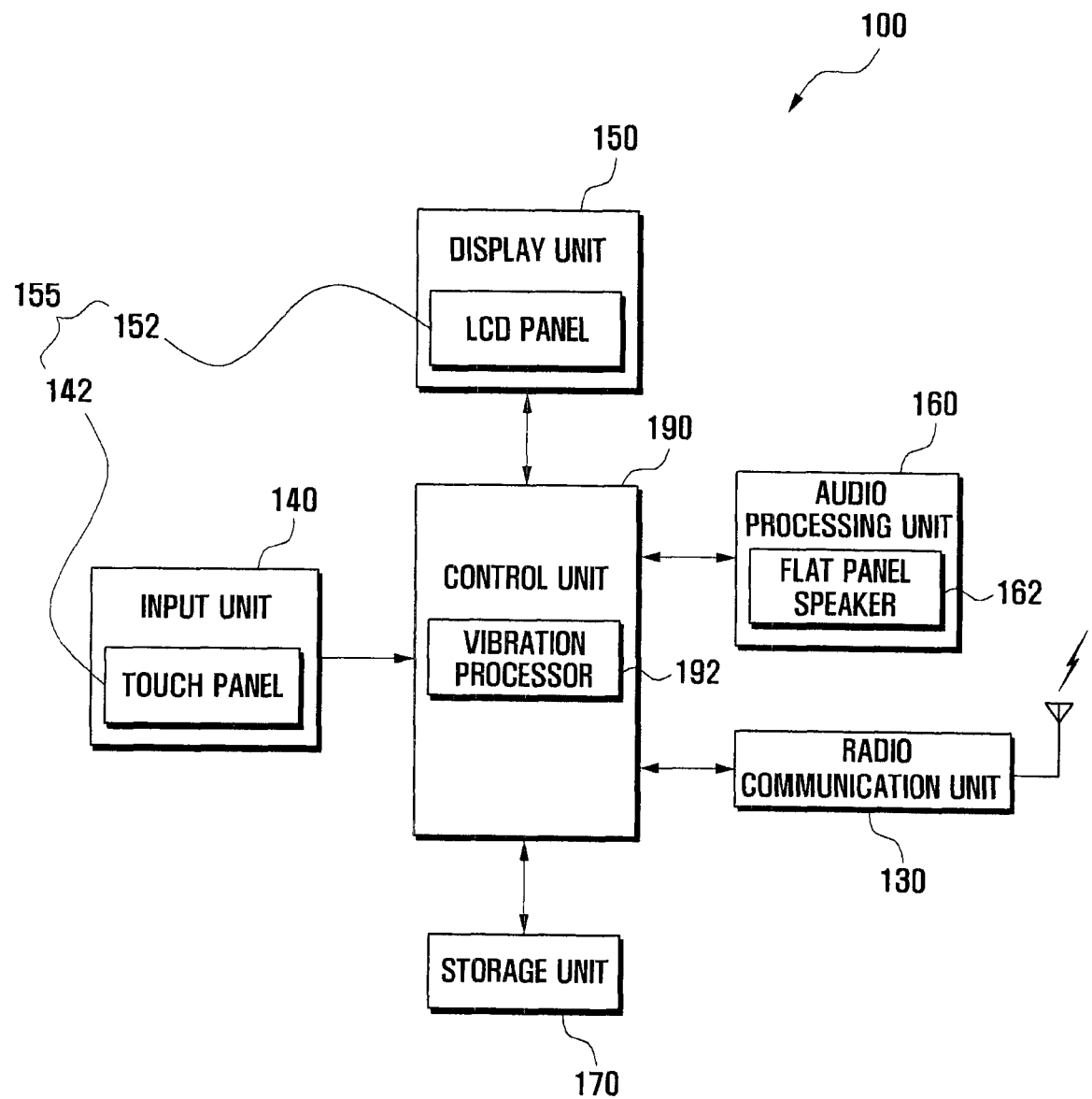
FIG. 1 is a block diagram illustrating a mobile terminal according to an exemplary embodiment of the present invention.

FIG. 1 is a block diagram illustrating a mobile terminal 100 according to an exemplary embodiment of the present invention.

Referring to FIG. 1, the mobile terminal 100 includes a radio communication unit 130, input unit 140, display unit 150, audio processing unit 160, storage unit 170, and control unit 190.

In operation, the radio communication unit 130 performs wireless data transmission and reception operations for the mobile terminal 100. The radio communication unit 130 can include a radio frequency (RF) transmitter for upconverting the frequency of a signal to be transmitted and amplifying the signal, and an RF receiver for low-noise amplifying a received signal and downconverting the frequency of the received signal. The radio communication unit 130 can forward data received through a radio channel to the control unit 190, and transmit data from the control unit 190 through the radio channel.

The display unit 150 displays various menus of the mobile terminal 100, data input by the user, function setting information, and information to be provided to the user. In the present embodiment, the display unit 150 includes a panel of liquid crystal display (LCD) devices. Hence, the display unit 150 can include an LCD controller for controlling LCD devices, and a video memory for storing video data.

To be more specific, the display unit 150 includes an LCD panel and a backlight. The LCD panel includes liquid crystal cells injected between two glass substrates, and adjusts light transmittance of the liquid crystal cells to display images. The amount of light passing through a liquid crystal cell is adjusted according to a corresponding video or pixel signal. The backlight emits light toward the LCD panel, and the user can view visual images formed using the light passing through the LCD panel. If the display unit 150 has a touch screen capability, it can also act as an input device performing in part or whole the function of the input unit 140.

The audio processing unit 160 includes a coder/decoder (codec). The codec may have a data codec for processing packet data and the like, and an audio codec for processing an audio signal such as a voice signal. In the call processing, the audio processing unit 160 converts a digital audio signal from the control unit 190 into an analog signal through the audio codec to output the analog signal to a flat panel speaker 162 (described later), and converts an analog audio signal from a microphone into a digital audio signal through the audio codec to provide the digital audio signal to the control unit 190.

Figure 2A:
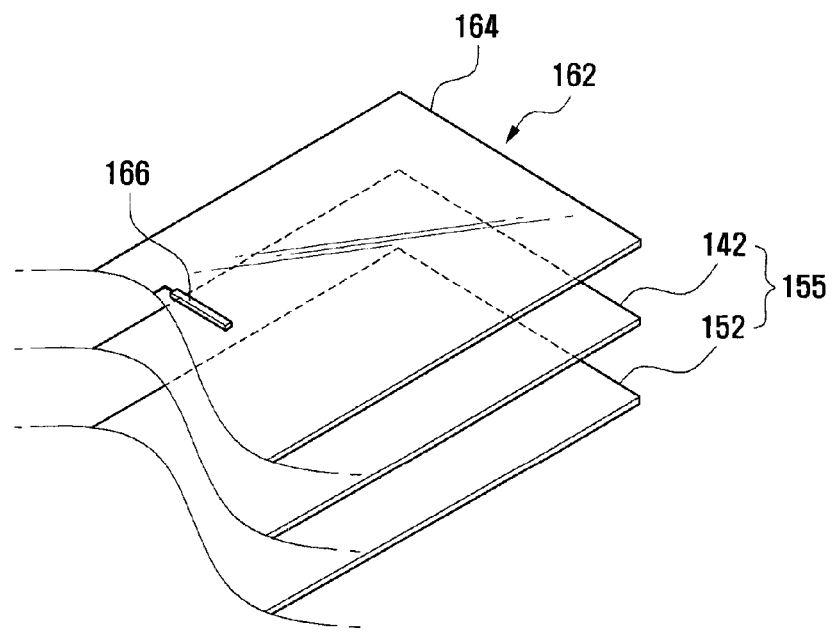
FIG. 2A is an exploded perspective view of a display unit having a flat panel speaker for the mobile terminal of FIG. 1.

In particular, the audio processing unit 160 produces sounds through the flat panel speaker 162. A flat panel speaker is a speaker in a thin-panel shape. In particular, a transparent flat panel speaker can be installed at the display screen (which the user can actually view) of a display apparatus such as a liquid crystal display, organic EL display or PDP, and hence serves to save installation space. FIG. 2A is an exploded perspective view of a display unit having a flat panel speaker 162. Referring to FIG. 2A, the flat panel speaker 162 is attached on a touch screen 155, and vibrates to produce sounds according to a signal coming from the audio processing unit 160. Here, the flat panel speaker 162 is a representative example of a flat panel sound output unit, and the phrase "flat panel" is used in a broad sense and may not refer to "complete flatness".

The flat panel speaker 162 includes a vibration panel 164 and vibration member 166. The vibration panel 164 is a flat panel installed on the touch screen 155, and can be made of an acrylic or glass substrate capable of protecting the touch screen 155.

In FIG. 2A, an exciter is used as the vibration member 166. The exciter is attached at a site of the vibration panel 164, and vibrates the vibration panel 164 according to a signal coming from a vibration processor 192 (described later).

Figure 2B:
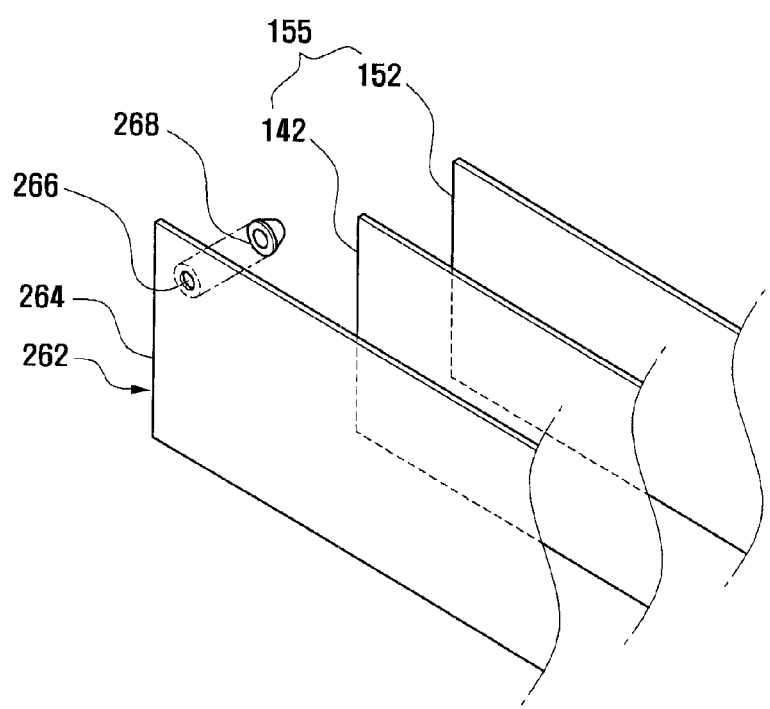
FIG. 2B is another exploded perspective view of a display unit having a flat panel speaker for the mobile terminal of FIG. 1.

The vibration member 166 of the flat panel speaker 162 is not limited to an exciter. FIG. 2B is an exploded perspective view of a display unit having another flat panel speaker 262. Referring to FIG. 2B, the flat panel speaker 262 includes a vibration panel 264, and a voice coil speaker 268 attached at a site of the vibration panel 264. In this case, the voice coil speaker 268 is used as a vibration member. The voice coil speaker 268 can cause the vibration panel 264 to vibrate, but may have difficulty in producing accurate sounds through the vibration panel 264.

To overcome this problem, the vibration panel 264 has an opening or hole 266 formed at a site where the voice coil speaker 268 is attached. The hole 266 is used to outwardly emit audible sounds output by the voice coil speaker 268.

When the voice coil speaker 268 is used as a vibration member, ordinary audible-frequency sounds (generated according to a signal from the audio processing unit) are emitted through the hole 266 to the outside, and the vibration processor 192 outputs a low-frequency signal to the voice coil speaker 268. In the present embodiment, signals of 20 to 200Hz are used for vibration. Signals of other frequency bands may also be employed according to the size, shape and configuration of the vibration panel 264. As described above, application of a low-frequency signal to the voice coil speaker 268 can generate vibrations strong enough to provide the user with an acceptable sense of touch.

A piezoelectric speaker, which employs a piezoelectric film as a vibration member, can be used as the flat panel speaker 162. Other means capable of causing the vibration panel 164 to vibrate known to artisians may also be used.

Note that a single flat panel speaker is employed for illustrative purposes. However, incorporating the teachings of the invention, multiple flat panel speakers may be employed to produce stereo or multi-channel sounds.

In addition, the flat panel speaker 162 can include one vibration panel and two or more vibration members. For example, an exciter and voice coil speaker can be installed on the same vibration panel, and used together.

The input unit 140 receives a signal related to a user command for controlling the mobile terminal 100, and sends the command signal to the control unit 190. Thereto, the input unit 140 includes a key input section (not shown) to generate a manipulation signal corresponding to a key input, and a touch panel 142 attached on an LCD panel 152 of the display unit 150.

As shown in FIG. 2A, the touch panel 142 is placed between the flat panel speaker 162 and LCD panel 152, and creates an input signal through generation of a voltage or current signal corresponding to a location at which a touch event occurs, and sends the input signal to the control unit 190.

The touch panel 142 can include: an upper substrate and a lower substrate, each coated with an indium-tin-oxide (ITO) film having an ITO electrode membrane or with a polyethylene terephthalate (PET) film having an ITO electrode membrane; electrode patterns formed on the ITO electrode membranes; and spacers for maintaining a constant gap between the upper substrate and lower substrate. Additionally, a conductive x-axis pattern and y-axis pattern, separated from each other by an insulator, are formed at edges of the ITO electrode membrane. When a finger or the like touches the upper substrate, the ITO electrode membrane of the upper substrate is brought into contact with that of the lower substrate. Then, a voltage is measured from the x-axis pattern and y-axis pattern, and the coordinates of the touched location are extracted and sent to the control unit 190.

In the following description, a touch screen 155 is introduced to indicate both the LCD panel 152 and touch panel 142.

The storage unit 170 stores application programs for embodiments of the present invention, digital contents, and data created by the user. The storage unit 170 can include a program storage section and a data storage section.

The program storage section stores an operating system for booting the mobile terminal 100, and application programs for supplementary functions related to, for example, music playing, and image or moving image playback. The storage unit 170 may provide a buffer space for temporarily storing user data, such as songs, still images and moving images, generated from execution of application programs related to music playing and playback of audio and video.

The data storage section stores user data, such as music files and moving image files, generated from the use of the mobile terminal 100.

The control unit 190 controls the overall operation of the mobile terminal 100 and signal exchange between internal elements thereof. That is, the control unit 190 controls signal exchange between the radio communication unit 130, input unit 140, display unit 150, audio processing unit 160, and storage unit 170.

The control unit 190 performs a requested operation for the mobile terminal 100 in response to an input signal from the input unit 140, and displays information related to the operation such as a current status or user menu through the display unit 150.

In particular, the control unit 190 controls the flat panel speaker 162 so as to provide the user with a sense of touch corresponding to a touch event. Thereto, the control unit 190 includes a vibration processor 192.

When a touch event occurs at the touch screen 155, the vibration processor 192 outputs a signal for vibration generation to the vibration member 166 of the flat panel speaker 162. If the vibration member 166 is an exciter or a piezoelectric film, the vibration processor 192 outputs a signal for driving the vibration member 166. In this case, electric power can be supplied to the vibration member 166.

When the voice coil speaker 268 (FIG. 2B) is used as a vibration member of the flat panel speaker 162, the vibration processor 192 outputs a low-frequency signal (for example, 20 to 200 Hz) to the vibration member. To effectively generate vibrations, this low-frequency signal is output in a manner corresponding to the resonance frequency of the vibration panel 164.

Next, a vibration generation method for the mobile terminal is described in detail. The description of the method will contribute to better understanding of the configuration of the mobile terminal 100.

Figure 3:
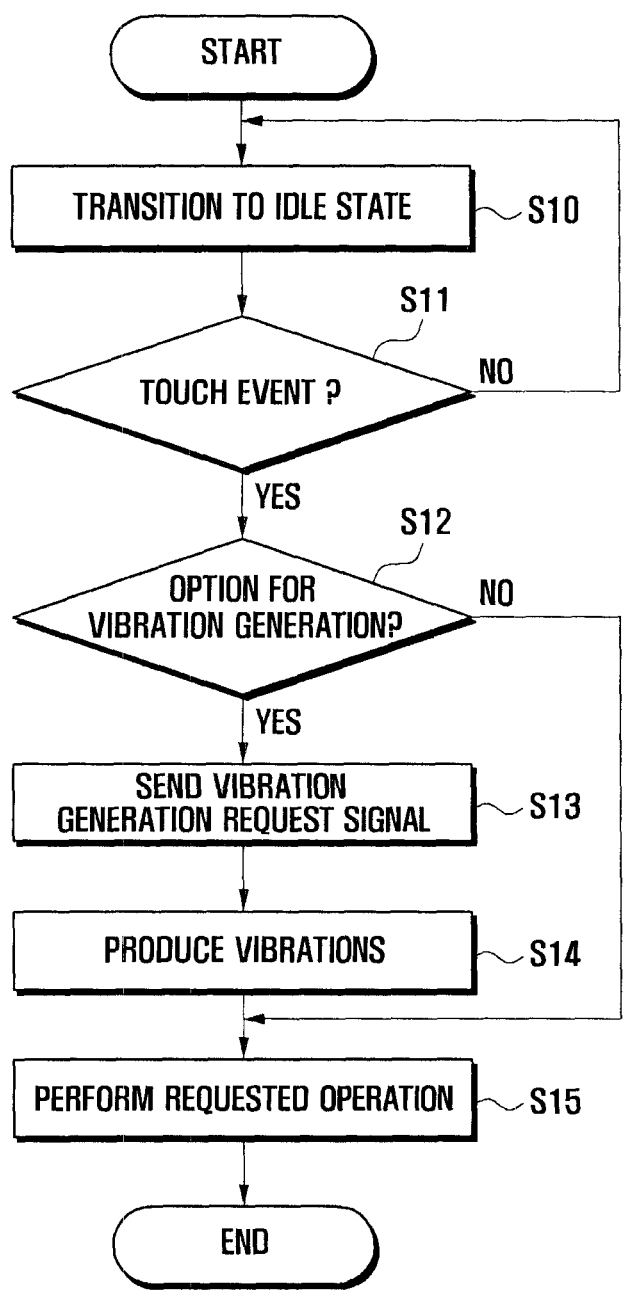
FIG. 3 is a flow chart illustrating a vibration generation method for a mobile terminal according to another exemplary embodiment of the present invention.

FIG. 3 is a flow chart illustrating a vibration generation method according to another exemplary embodiment of the present invention.

Referring to FIGS. 1 to 3, upon power-on, the control unit 190 of the mobile terminal 100 makes a transition to an idle state as a normal operation (S10).

The vibration processor 192 of the control unit 190 checks whether a touch event occurs at the touch screen 155 (S11). A touch event occurs when the user applies a physical force to the touch panel of the touch screen 155 to manipulate the mobile terminal 100. If a touch event has occurred, the vibration processor 192 checks whether an option for vibration generation is set (S12).

Options for vibration generation are set by the user and stored in advance. These options can be related to whether to output vibrations, magnitudes of vibrations, and whether to output vibrations for all touch events or only for selected touch events. Options for vibration generation can be set whenever necessary. This option setting process is already known, and hence the description thereof is omitted.

If no option for vibration generation is set, the vibration processor 192 does not perform any operation, and the control unit 190 performs an operation associated with the touch event (S15).

If an option for vibration generation is set, the vibration processor 192 sends a signal for requesting vibration generation to the vibration member of the flat panel speaker 162 (S13). As described before, if the vibration member is an exciter or a piezoelectric film, the vibration processor 192 outputs a signal for driving the vibration member. When the vibration member is a voice coil speaker, the vibration processor 192 outputs a low-frequency signal (for example, 150 Hz) to the vibration member in a manner corresponding to the resonance frequency of the vibration panel 164.

Upon reception of the signal for requesting vibration generation, the vibration member actuates the vibration panel to produce vibrations (S14). Here, vibrations are continued for a preset duration (for example, 0.2 ms) so that the user can feel feedback of the touch event.

At the same time, the control unit 190 performs an operation associated with the touch event (S15).

As described above, the vibration generation method generates vibrations as feedback of a touch event using a flat panel sound output unit. Hence, the method can provide a sense of touch to the user without use of a separate vibration motor. In addition, one flat panel speaker can be used for both sound output and vibration output, increasing space efficiency of the mobile terminal.

It should be understood that many variations and modifications of the basic inventive concept herein described are possible.

For example, in the description, the flat panel speaker is attached on the touch screen. However, the flat panel speaker can be installed at another site in alternate embodiment.

In addition, vibrations are generated as feedback of a touch event in a mobile terminal. It should be noted that this concept can be applied to other electronic appliances having a touch screen, such as a mobile device, personal computer, notebook computer, and portable multimedia player.

What is claimed is:

1. A mobile terminal comprising:
    a touch screen;
    a flat panel sound output unit comprising one or more flat panel speakers within a vibration panel that is configured to provide both sounds and vibrations, said flat panel sound output unit being coupled to a surface of the touch screen, said flat panel sound output unit generates sounds and vibrations according to an input signal;
    a vibration processor sending, when a touch event occurs at the touch screen, a signal to the flat panel sound output unit, the signal directing the flat panel sound output unit to generate vibrations corresponding to the touch event without a separate vibration motor; and
    an audio processing unit sending an audio signal to the flat panel sound output unit to produce sounds corresponding to the audio signal;
    wherein vibration panel of the flat panel sound output unit comprises a transparent vibration panel coupled to an exterior surface of the touch screen, and a vibration member coupled to the vibration panel causing the vibration panel to vibrate, and
    wherein the at least one of the one or more flat panel speakers of the flat panel sound output unit comprises a piezoelectric speaker employing a piezoelectric film as the vibration member.

2. The mobile terminal of claim 1, wherein the vibration member is an exciter converting an electrical signal into mechanical vibrations.

3. The mobile terminal of claim 1, wherein the vibration member is a voice coil speaker.

4. The mobile terminal of claim 3, wherein the vibration processor sends, when a touch event occurs at the touch screen, a low-frequency signal to the vibration member.

5. The mobile terminal of claim 4, wherein the low-frequency signal is defined by a frequency of 20 to 200 Hz.

6. The mobile terminal of claim 4, wherein the vibration panel has an opening to an exterior of the mobile terminal formed at a location below which the voice coil speaker is provided.

7. The mobile terminal of claim 4, wherein the vibration processor sends a signal to the vibration member in a manner corresponding to the resonance frequency of the vibration panel.

8. The mobile terminal of claim 1, wherein the vibration member comprises an exciter and a voice coil speaker, and generates vibrations using both the exciter and voice coil speaker.

9. A vibration and sound generation method, using a flat panel sound output unit coupled to a surface of a touch screen, comprising:

sending, upon a detection of s touch event, a vibration generation request signal to the flat panel sound output unit that includes one or more flat panel speakers within a vibration panel that is configured to provide both sounds and vibrations;

vibrating the flat panel sound output unit in response to the vibration generation request signal without a separate vibration motor;

sending, upon a detection of sound output, an audio signal to the flat panel sound output unit; and vibrating the flat panel sound output unit to produce sounds corresponding to the audio signal wherein the flat panel sound output unit comprises a vibration panel coupled to the touch screen, and a vibration member coupled to the vibration panel causing the vibration panel to vibrate, and wherein the flat panel sound output unit is a piezoelectric speaker employing a piezoelectric film as a vibration member.

10. The vibration generation method of claim 9, wherein the vibration member is an exciter converting an electrical signal into mechanical vibrations.

11. The vibration generation method of claim 9, wherein the vibration member is a voice coil speaker.

12. The vibration generation method of claim 11, wherein sending a vibration generation request signal comprises sending a low-frequency signal to the flat panel sound output unit.

13. The vibration generation method of claim 12, wherein a low-frequency signal ranges from 20 to 200 Hz.

14. The vibration generation method of claim 11, wherein the vibration panel has an opening to an exterior of a device formed at a location below which the voice coil speaker is attached.

15. The vibration generation method of claim 11, wherein sending a vibration generation request signal comprises sends a signal to the vibration member in a manner corresponding to the resonance frequency of the vibration panel.

* * * * *

UNITED STATES PATENT AND TRADEMARK OFFICE
CERTIFICATE OF CORRECTION

| | | |
|---|---|---|
| PATENT NO. | : 8,892,156 B2 | Page 1 of 1 |
| APPLICATION NO. | : 12/350275 | |
| DATED | : November 18, 2014 | |
| INVENTOR(S) | : Eun Hwa Lee et al. | |

It is certified that error appears in the above-identified patent and that said Letters Patent is hereby corrected as shown below:

In the Claims,

Column 7, Claim 9, Line 26 should read as follows:
--...detection of a touch...--

Column 8, Claim 9, Lines 4-5 should read as follows:
--...the audio signal, wherein...--

Column 8, Claim 15, Lines 27-28 should read as follows:
--...comprises sending a signal...--

Signed and Sealed this
Seventeenth Day of February, 2015

Michelle K. Lee
*Deputy Director of the United States Patent and Trademark Office*